Oct. 25, 1949.  R. BECK  2,485,690
THERMOMETER CASE
Filed Sept. 19, 1945  2 Sheets-Sheet 1
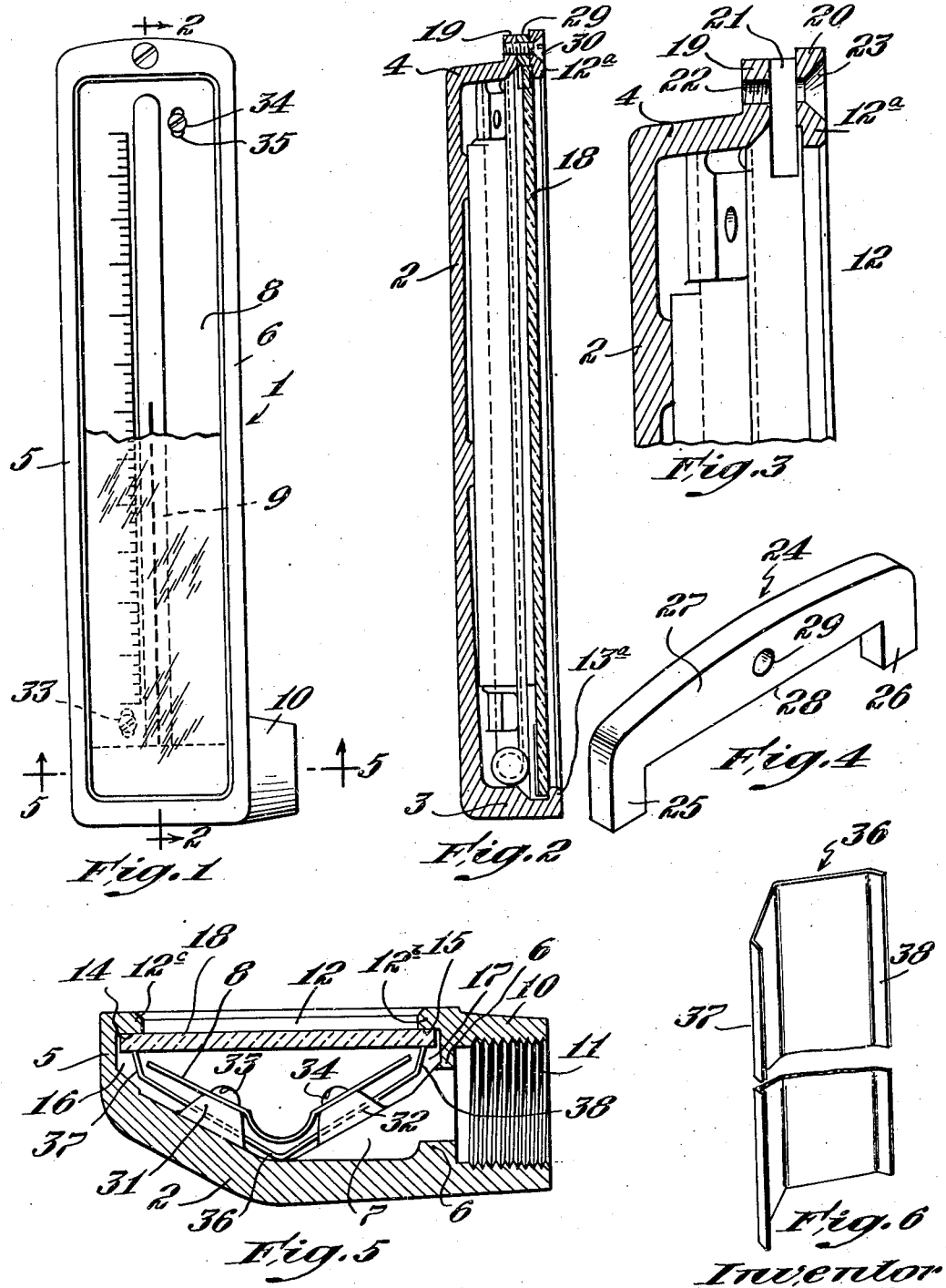
Inventor
Rudolf Beck Oct. 25, 1949.　　　　R. BECK　　　　2,485,690
THERMOMETER CASE Filed Sept. 19, 1945　　　　　　　　2 Sheets-Sheet 2

Inventor
Rudolf Beck
by Roberts Cushman & Grover
att'ys.

Patented Oct. 25, 1949

2,485,690

UNITED STATES PATENT OFFICE 2,485,690

THERMOMETER CASE

Rudolf Beck, Fairfield, Conn., assignor to Manning, Maxwell & Moore, Incorporated, New York, N. Y., a corporation of New Jersey Application September 19, 1945, Serial No. 617,228

5 Claims. (Cl. 73—374)

This invention pertains to thermometers of the liquid-in-glass type wherein the scale and glass tube are enclosed within a protective case or housing having a transparent front panel of glass or its equivalent, and relates in particular to an improved case or housing for such a thermometer.

Heretofore it has been customary to mount the front glass panel in a frame separate from the main body of the case and to attach the frame with its glass to the body of the case, for example by means of screws. In other instances the case has been made of one piece construction, with provision for introducing the glass panel from the front and having one or more flexible retainer devices, bordering frames or the like applied after installation of the glass and secured in one way or another to the body of the case.

All of such prior constructions reduce the size of the sight opening through the glass panel. They necessarily employ a plurality of fastening elements or depend upon friction to hold them in place and are all subject to the disadvantage that the glass panel is not held firmly enough to avoid rattling when the instrument is subjected to vibration, or adequately to exclude moisture or dust.

A principal object of the present invention is to provide a thermometer case of simple construction wherein the sight opening is unobstructed by the glass retaining means; the body of the case may be of one piece construction and the glass held in place without possibility of accidental escape and without danger of rattling when subjected to vibration; and having a minimum number of parts which must be manipulated in installing the glass in the case. A further object is to provide a simple and effective means for holding the glass firmly in place within the case and so as to provide a substantially air-tight joint between the case and the glass. Other and further objects and advantages of the invention will be pointed out in the following more detailed description and by reference to the accompanying drawings wherein Fig. 1 is a front elevation of a thermometer having a case embodying the present invention.

Fig. 2 is a section substantially on the line 2—2 of Fig. 1.

Fig. 3 is a fragmentary section in the same plane as that of Fig. 2, showing the upper portion of the case to larger scale and omitting certain parts.

Fig. 4 is a perspective view, to larger scale, of a closure member for the entrance opening at the upper end of the case.

Fig. 5 is a section to large scale substantially on the line 5—5 of Fig. 1.

Fig. 6 is a fragmentary perspective view of a resilient retaining element for holding the transparent panel in position.

Figure 7:
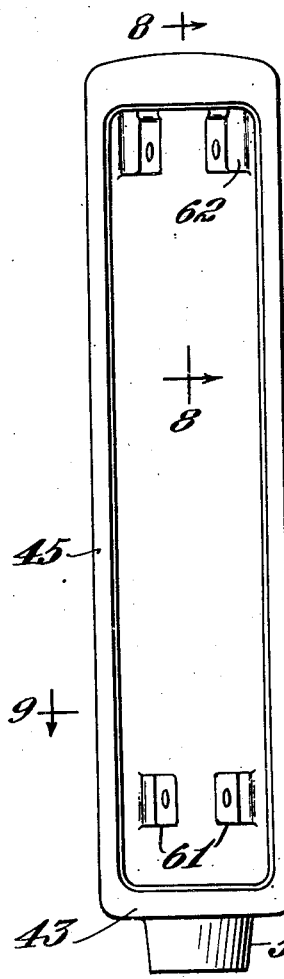
Fig. 7 is a front elevation of a case of modified construction embodying the present invention.
Figure 8:
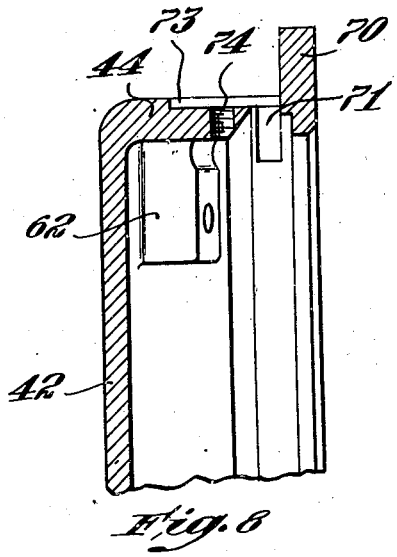
Fig. 8 is a fragmentary vertical section, to larger scale substantially, on the line 8—8 of Fig. 7 showing details of the upper part of the case.

Referring to the drawings, the numeral 1 designates a thermometer of the liquid-in-glass type having a protective casing which houses the liquid containing tube and the scale, and which is designed to be connected rigidly to a suitable support, for example to a pipe or other fitting within which the bulb of the thermometer is arranged and which conducts the liquid (whose temperature is to be measured) to the thermometer bulb. However, while the invention is primarily designed for use in thermometers of this type, it is equally useful in thermometers in which the bulb is housed within the casing itself and is exposed only to the temperature of the air or other medium within the case.

In accordance with the present invention, the case which houses the liquid-containing tube and scale is of unitary construction, for example a sand casting, and comprises a back wall 2, a bottom wall 3, a top wall 4 and spaced side walls 5 and 6, said walls defining an elongate trough-like chamber 7 within which is housed the scale 8 and the liquid containing tube 9. As illustrated in Figs. 1 and 5, the casing also comprises an integral, lateral boss 10 internally screw-threaded at 11 for the reception of a pipe nipple or other fitting, which may constitute a support for the casing and also, if desired, house the thermometer bulb.

The casing is provided with a front opening 12 here shown as elongate and substantially rectangular, and which is too small to permit the transparent front panel to be introduced through it into the chamber 7. The opening 12 is bordered by the flanges 12b and 12c (Fig. 5) at its sides and by flanges 12a and 13a (Fig. 2) at its top and bottom respectively. The inner faces 14 and 15 of these flange members (which lie in the same plane) define the forward walls of channels 16 and 17 and collectively constitute a rigid abutment for the transparent front panel 18 of suitable rigid material, for example glass or a transparent synthetic resin. If desired, packing material, not shown, may be interposed between the transparent panel and the abutment surfaces 14 and 15.

At its upper part, the forward portion of the case is extended upwardly above the top wall 4, as shown at 19 and 20 Fig. 3, and in this portion of the case there is provided an entrance slot 21 leading through the top wall into the channels 16 and 17. This slot may be provided in various ways, but when the casing is a sand casting, such as above suggested, the slot 21 may be conveniently formed by a milling operation so that it extends completely through the case from side to side. This slot 21 should be of a front-to-rear thickness slightly greater than the thickness of the transparent panel to be used. The parts 19 and 20 are provided with aligned bores 22 and 23, the latter preferably having a counter-sunk beveled forward end and the part 22 being screw-threaded. For closing this slot 21 (after the transparent panel has been inserted) there is provided a bridge-like closure plug 24, Fig. 4, consisting of a piece of suitable rigid material having the parallel leg portions 25 and 26 designed to close the opposite lateral ends respectively of the slot 21, and the transversely extending body portion 27 designed to close the upper part of the slot 21, the part 27 having the lower surface 28 which is designed to overlie the upper edge of the transparent panel when the latter has been put in place. The part 24 is provided with an opening 29 which is aligned with the bores 22 and 23 when the parts are assembled, and a retaining screw 30 passes through the bore 23 and the opening 29 and is screw-threaded into the opening 22, thus holding the closure plug in place. This arrangement makes it impossible to impose undue pressure on the transparent glass panel when putting the closure plug in place.

The rear wall of the chamber 7 is provided with pairs of integral lugs 31 and 32, one pair of these lugs being disposed near the bottom of the chamber and the other pair near the top, the lugs having smooth forward surfaces for engagement with the opposite legs of the scale 8, the latter being substantially V-shaped in transverse section and being secured to the lugs 31 and 32 by screws 33 and 34 respectively. Preferably these screws pass through elongate slots 35 in the scale, thus permitting the scale to be adjusted slightly in a vertical direction in calibrating the instrument.

Interposed between the vertically spaced pairs of lugs 31 and 32 there is arranged a panel-retaining device 36 preferably substantially V-shaped in transverse section and consisting of a length of resilient sheet metal or the like, bent along a longitudinal line to form a central abutment knee and having the forwardly directed legs 37 and 38 which bear against the opposite margins of the transparent panel 18 and which urge the panel forcibly against the abutment surfaces 14 and 15 the bend or abutment knee bearing against the inner surface of the rear wall of the case (Fig. 5). The panel is thus held firmly in place so that it does not rattle if the instrument is subjected to vibrations. Preferably the retainer 36 is of such stiffness and resiliency as to hold the panel against the surfaces 14 and 15 so as to make a substantially air-tight joint.

In assembling the parts, the retainer 36 is first placed within the chamber 7, being introduced through the front opening 12. The scale 8 is then likewise introduced through the opening 12 and secured in place by the screws 33 and 34. The liquid containing tube 9 is now put in place, and, if desired, the instrument is calibrated by adjustment of the scale, and then the panel 18 is slid downwardly through the slot 21 and into the channels 16 and 17 until its lower edge is located behind the flange 13a. During the downward movement of the panel, the legs 37 and 38 of the retainer 36 are placed under tension, so that when the panel is finally located in proper position, the resilient legs 37 and 38 hold it firmly in place. The closure plug 24 is now introduced into the slot 21 and fastened in place by the screw 30.

Figure 9:
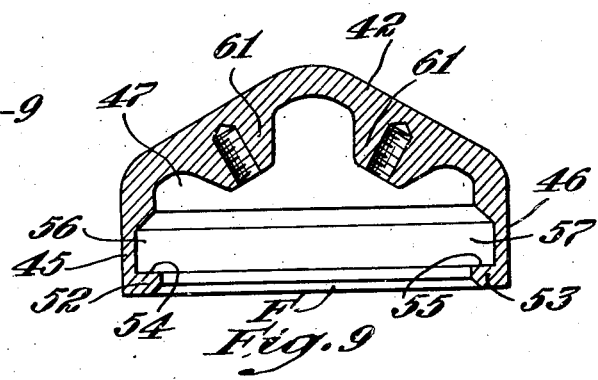
Fig. 9 is a section, to larger scale, substantially on the line 9—9 of Fig. 7.
Figure 10:
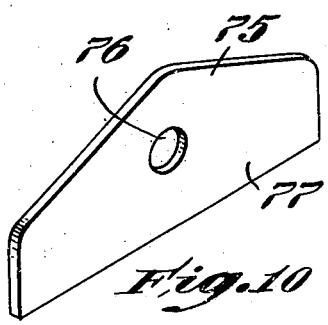
Fig. 10 is a perspective view of a closure member useful with the case of Figs. 7 to 9 inclusive.

In Figs. 7 to 10 a modified construction is illustrated wherein the case 41 may for example be a die-casting. This case is a unitary piece of material, as in the previous instance, and comprises the rear wall 42, the top wall 44 (Fig. 8), the bottom wall 43 (Fig. 7) and the side walls 45 and 46 (Fig. 9). The walls of the case define the chamber 47 which houses the scale and liquid-containing tube (not shown). The casing has the front opening F, bordered by the flanges 52 and 53 having the surfaces 54 and 55 respectively, which constitute the front walls of the channels 56 and 57. At its upper end the casing has an upwardly directed flange portion 70 projecting above the top wall 44 of the casing and providing a suitable finish, and just to the rear of this member 70 the casing is provided with an entrance slot 71 merging with the channels 56 and 57. However, this slot 71 does not extend transversely through the side walls of the case. To the rear of the part 70 the top wall 44 is furnished with a recess 73, and in the floor of this recess there is provided a screw-threaded bore 74. The closure plate 75, Fig. 10, is designed to rest in the recess 73, the plate 75 having an aperture 76 for the reception of a screw which enters the screw-threaded aperture 74 thus retaining the plate in the recess 73. The forward portion 77 of the plate (when then positioned) overlies the slot 71 and forms a closure for the latter.

In this arrangement, the case is provided with a pair of integral bosses 61 at its lower portion and with a similar pair of bosses 62 at the upper portion. These bosses project into the chamber 47 and are designed to form supports for the scale (not shown). In this construction the case is provided with a downwardly directed boss 50 projecting from its lower wall 43, the boss 50 being internally screw-threaded for the reception of a pipe fitting by means of which the case is supported and which may, also if desired, house the thermometer bulb.

While certain desirable embodiments of the invention have been illustrated by way of example, it is to be understood that the invention is broadly inclusive of any and all modifications falling within the scope of the appended claims.

I claim:

1. A thermometer case having a transparent front closure panel, said case comprising an elongate housing having therein a chamber for the reception of a scale and a liquid-containing glass tube, said chamber having a substantially rectangular front opening, the case having a channel bordering said opening, the front wall of the chanel being a substantially plane surface constituting an abutment for the marginal portion of the transparent panel, said channel merging at one end of the case with an entrance slot extending through the substance of the case and which is of the full transverse width of the case, the slot being of such shape and dimensions as to permit the introduction therethrough of the front closure panel, a bridge-like plug for closing said slot, said plug comprising a transverse portion designed to overlie the upper edge of the transparent panel and spaced leg portions designed to close the opposite sides respectively of the slot, a screw whose axis is perpendicular to the plane of the transverse panel, said screw passing through the plug and having threaded engagement with said one end of the case, said screw being operative removably to secure the plug in place, the casing having spaced scale-positioning means adjacent to opposite ends respectively of the chamber, and a panel retaining element interposed between said scale-positioning means and operative to hold the panel firmly against said abutment.

2. A thermometer case having a transparent front closure panel, said case comprising an elongate housing having therein a chamber for the reception of a scale and a liquid-containing glass tube, said chamber having a substantially rectangular front opening, the case having a channel bordering said opening, the front wall of the channel being a substantially plane surface constituting an abutment for the marginal portion of the transparent panel, said channel merging at one end of the case with an entrance slot extending through the substance of the case, and throughout the full transverse width of the case, the slot being of such shape and dimension as to permit the introduction therethrough of the front closure panel, a removable plug for closing the slot, said plug having a transverse portion designed to overlie the upper edge of the transparent panel, said transverse portion having an opening whose axis is perpendicular to the plane of the panel, the case having a threaded socket coaxial with said opening, a screw passing through the aperture in the transverse portion of the plug and into said socket for removably holding the plug in place, the housing having therein means for positioning the scale, means for holding the scale in place and resilient means operative to press the transparent panel against said abutment.

3. A thermometer case having a transparent front closure panel, said case comprising an elongate housing having therein a chamber for the reception of a scale and a liquid-containing glass tube, said chamber having a substantially rectangular front opening, the case having a channel bordering said opening, the front wall of the channel being a substantially plane surface constituting an abutment for the marginal portion of the transparent panel, said chanel merging at the one end of the case with an entrance slot extending through the substance of the case and of such shape and dimension as to permit the introduction therethrough of the front closure panel, a removable closure for the slot, the case having integral lugs projecting into the chamber and constituting positioning means for the scale, and a resilient retainer, of substantially V-shape in transverse section and having a longitudinally extending bend and forwardly directed arms, the bend bearing against the inner surface of the casing and the arms bearing against the opposite margins of the panel and hold the latter against the abutment.

4. A thermometer case having a transparent front closure panel, said case comprising an elongate housing having therein a chamber for the reception of a scale and a liquid-containing glass tube, said chamber having a substantially rectangular front opening, the case having a channel bordering said opening, the front wall of the channel being a substantially plane surface constituting an abutment for the marginal portion of the transparent panel, said channel merging at the one end of the case with an entrance slot extending through the substance of the case and of such shape and dimension as to permit the introduction therethrough of the front closure panel, the slot being of the full transverse width of the casing, a closure member for the slot having spaced legs designed to close the opposite ends respectively of the slot, and a transverse portion designed to overlap the upper end of the transparent panel, and means for removably securing the closure member to the casing.

5. A thermometer case having a transparent front closure panel, said case comprising an elongate housing having therein a chamber for the reception of a scale and a liquid-containing glass tube, said chamber having a substantially rectangular front opening, the case having a channel bordering said opening, the front wall of the channel being a substantially plane surface constituting an abutment for the marginal portion of the transparent panel, said channel merging at the one end of the case with an entrance slot extending through the substance of the case and of such shape and dimension as to permit the introduction therethrough of the front closure panel, the casing having spaced, scale positioning lugs near the top and bottom respectively of the chamber, a scale, substantially V-shaped in transverse section, secured to said lugs, an elongate, resilient retainer, arranged behind the scale and disposed between said lugs, said retainer, being of substantially V-shape in transverse section and having a longitudinally extending bend and forwardly directed legs disposed at opposite sides respectively of the scale and, the bend bearing against the inner surface of the rear wall of the case and the arms engaging the marginal portions of the transparent panel thereby to hold the panel firmly against the abutment.

RUDOLF BECK.

REFERENCES CITED

The following references are of record in the file of this patent:

UNITED STATES PATENTS

| Number | Name | Date |
| --- | --- | --- |
| 1,984,819 | Bandoly | Dec. 18, 1934 |
| 2,272,240 | Edwards | Feb. 10, 1942 |
| 2,312,873 | Bruns | Mar. 2, 1943 |
| 2,389,485 | Bruns | Nov. 20, 1945 |
| 2,395,701 | Weiss, Jr. | Feb. 26, 1946 |